Patented Apr. 13, 1937

2,077,063

UNITED STATES PATENT OFFICE 2,077,063

POLYMETHINE DYESTUFFS AND A PROCESS OF PREPARING THEM

Paul Wolff, Frankfort-on-the-Main, Germany, assignor to General Aniline Works, Inc., New York, N. Y., a corporation of Delaware No Drawing. Application December 10, 1934, Serial No. 756,893. In Germany December 16, 1933

9 Claims. (Cl. 260—38)

The present invention relates to polymethine dyestuffs and to a process of preparing them.

I have found that valuable dyestuffs of the polymethine series may be obtained by condensing an indoline compound which contains in alpha-position to the nitrogen a reactive methylene group in which one hydrogen atom is replaced by the aldehyde group, for instance, an aldehyde of the following general formula:

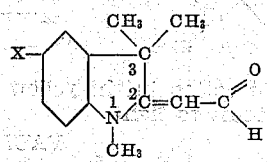

wherein X means a substituent, with an equimolecular proportion of a partially hydrogenated heterocyclic nitrogen compound such as, for instance, dihydro-α-phenylindol, tetrahydroquinoline or the like, in the presence of a condensing agent such as, phosphorus oxychloride, piperidine, or acetic anhydride, and advantageously in presence of a solvent such benzene, acetic anhydride, nitrobenzene, pyridine or the like. The products thus obtained are new. Products of the following constitution are, for instance, obtained:

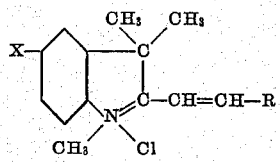

wherein X means a substituent and R means the radical of the partially hydrogenated heterocyclic compound.

The following examples serve to illustrate the invention but they are not intended to limit it thereto, the parts being by weight unless otherwise stated:

(1) 20.1 parts of 1,3,3-trimethylindoline-2-methylene-ω-aldehyde and 19.5 parts of dihydro-α-phenylindol are dissolved in 100 parts of benzene; 6 parts of phosphorus oxychloride are added to the solution drop by drop at about 15° C. to 20° C, and this temperature is maintained until the formation of the dyestuff is completed. The benzene is expelled, and the remaining dyestuff is dissolved in hot water; on cooling it separates from the solution in the form of well defined crystals. It dyes tannin mordanted cotton yellow tints of an excellent clearness and very good fastness to light.

(2) 20.1 parts of 1,3,3-trimethylindoline-2-methylene-ω-aldehyde are condensed with 13.3 parts of dihydro-α-methylindol in the manner described in Example 1) and the product is worked up as therein described. A dyestuff is obtained which also dyes tannin mordanted cotton yellow tints of the same clearness and good fastness to light.

(3) 20.1 parts of 1,3,3-trimethylindoline-2-methylene-ω-aldehyde are condensed with 13.3 parts of tetrahydroquinoline in 100 grams of benzene at about 15° C. in the presence of 6 parts of phosphorus oxychloride. The benzene is then expelled and the dyestuff so obtained is recrystallized from water. The recrystallized dyestuff dyes tannin mordanted cotton clear yellow tints of very good fastness to light.

(4) 23 parts of 1,3,3-trimethyl-5-methoxyindoline-2-methylene-ω-aldehyde are condensed with 13.3 parts of tetrahydroquinoline in the manner described in the foregoing examples in the presence of 6 parts of phosphorus oxychloride. A dyestuff is obtained which crystallizes from water in the form of small needles of a golden luster. It dyes tannin mordanted cotton bright yellow tints of an excellent fastness to light.

We claim:

I claim:

aldehyde compound of the general formula:

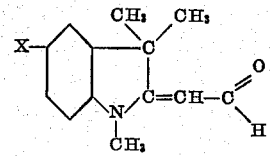

wherein X means a member of the group consisting of hydrogen and methoxy, with a hydrogenated heterocyclic nitrogen compound of the group consisting of dihydro-indoles and tetrahydroquinolines by means of a condensing agent of the group consisting of phosphorus oxychloride and acetic anhydride in the presence of a solvent.

2. The process which comprises condensing at a temperature of about 15° C. to about 20° C. an aldehyde compound of the general formula:

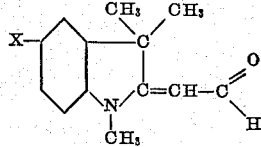

wherein X means a member of the group consisting of hydrogen and methoxy with a hydrogenated heterocyclic nitrogen compound of the group consisting of dihydro-indoles and tetrahydroquinolines by means of a condensing agent of the group consisting of phosphorus oxychloride and acetic anhydride in the presence of a solvent.

3. The process which comprises condensing at a temperature of about 15° C. to about 20° C. 1,3,3 - trimethylindoline-2-methylene-ω-aldehyde with dihydro-α-phenylindol by means of phosphorus oxychloride in the presence of benzene.

4. The process which comprises condensing at a temperature of about 15° C. to about 20° C. 1,3,3-trimethylindoline-2-methylene-ω-aldehyde with dihydro-α-methylindol by means of phosphorus oxychloride in the presence of benzene.

5. The process which comprises condensing at a temperature of about 15° C. to about 20° C. 1,3,3-trimethyl-5-methoxyindoline-2-methylene-ω-aldehyde with tetrahydroquinoline by means of phosphorus oxychloride in the presence of benzene.

6. The compounds of the general formula:

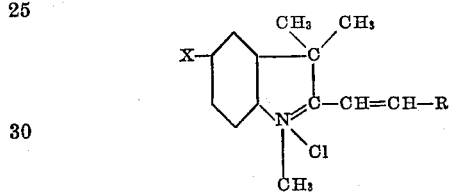

wherein X means a member of the group consisting of hydrogen and methoxy and R means the radical of a hydrogenated heterocyclic compound of the group consisting of dihydro-indoles and tetrahydroquinolines.

7. The compound of the formula:

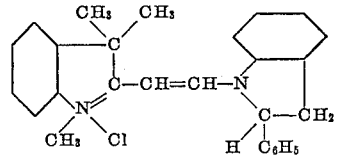

dyeing tanned cotton yellow tints of an excellent clearness and very good fastness to light.

8. The compound of the formula:

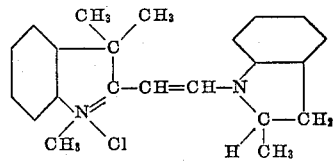

dyeing tanned cotton yellow tints of an excellent clearness and good fastness to light.

9. The compound of the formula:

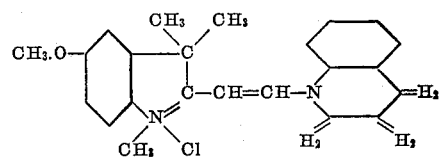

dyeing tanned cotton bright yellow tints of an excellent fastness to light.

PAUL WOLFF.

CERTIFICATE OF CORRECTION.

Patent No. 2,077,063.                                           April 13, 1937.

PAUL WOLFF.

It is hereby certified that error appears in the printed specification of the above numbered patent requiring correction as follows: Page 1, second column, line 28, strike out the words and colon "We claim:"; line 30, before "aldehyde" insert as line 1 of the claim the numeral and words 1. The process which comprises condensing an; and that the said Letters Patent should be read with these corrections therein that the same may conform to the record of the case in the Patent Office.

Signed and sealed this 16th day of November, A. D. 1937.

Henry Van Arsdale,
Acting Commissioner of Patents.

(Seal)